Nov. 4, 1941.   A. H. DICKINSON ET AL   2,261,542
READING MACHINE
Filed Dec. 21, 1937     9 Sheets-Sheet 1

INVENTORS
Arthur H. Dickinson
John N. Wheeler
BY
W. M. Wilson
ATTORNEY

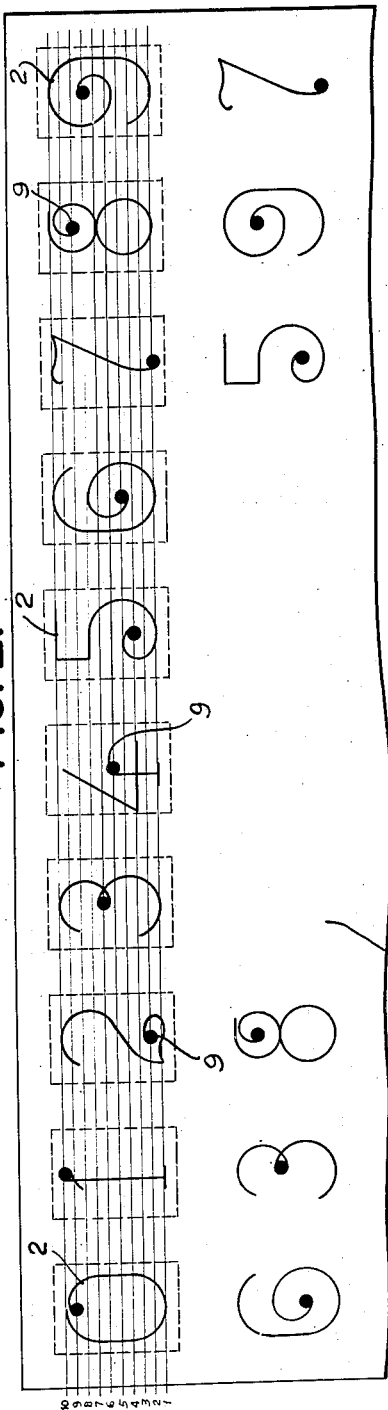

Nov. 4, 1941.  A. H. DICKINSON ET AL  2,261,542

READING MACHINE

Filed Dec. 21, 1937   9 Sheets-Sheet 3

INVENTORS
Arthur H. Dickinson
John N. Wheeler
BY
ATTORNEY

Nov. 4, 1941.  A. H. DICKINSON ET AL  2,261,542
READING MACHINE
Filed Dec. 21, 1937   9 Sheets-Sheet 4

INVENTORS
Arthur H. Dickinson
John N. Wheeler
BY
ATTORNEY

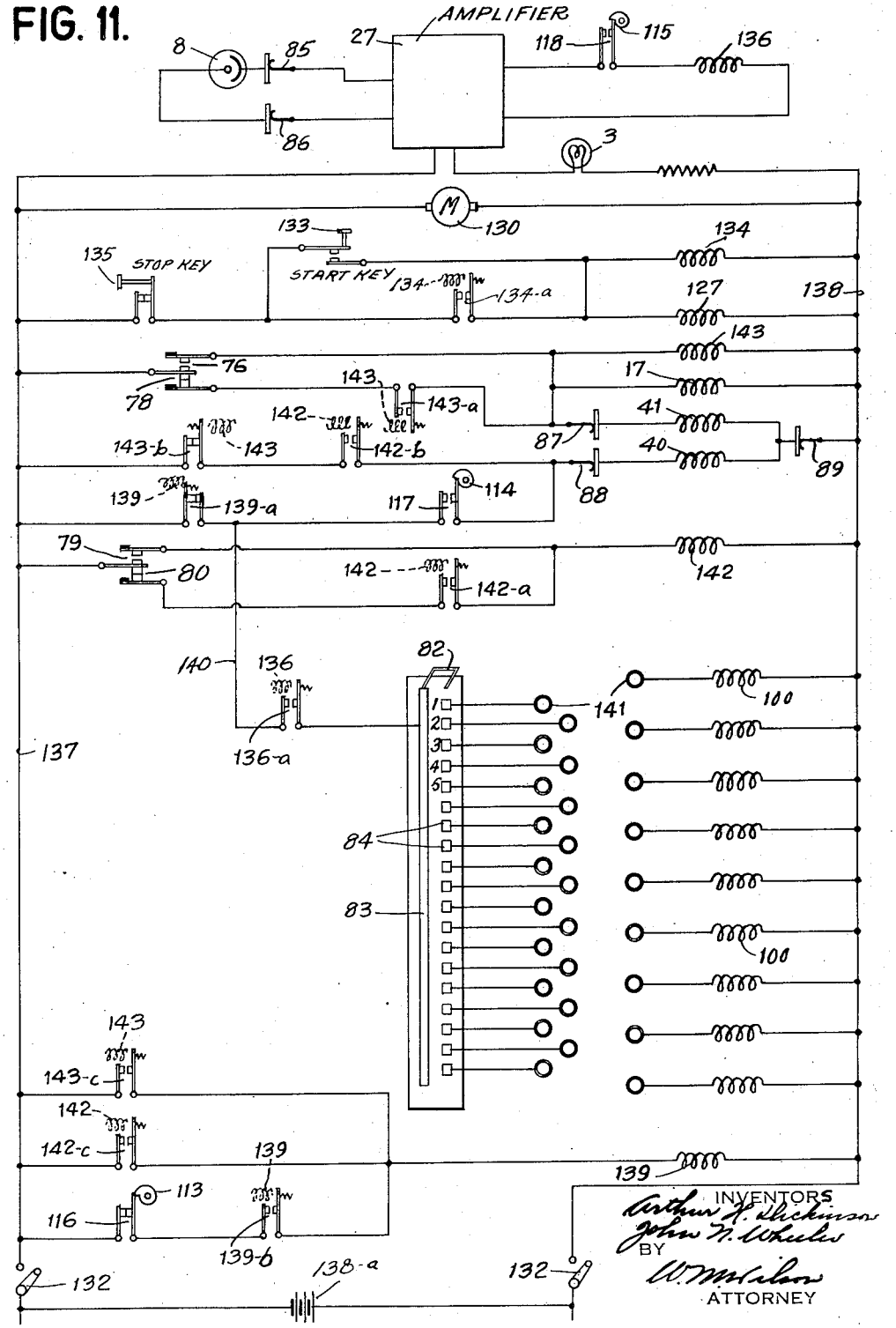

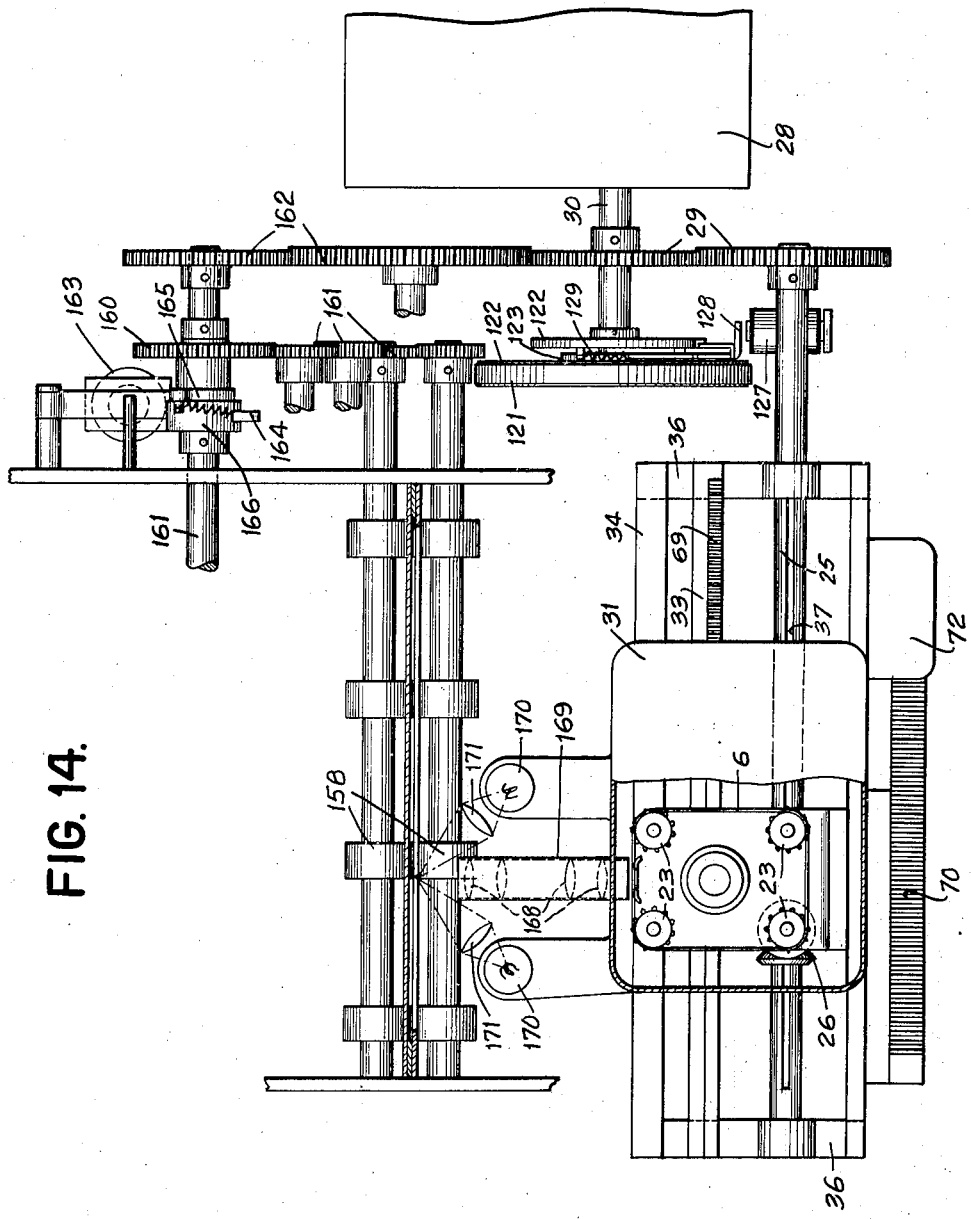

Patented Nov. 4, 1941

2,261,542

UNITED STATES PATENT OFFICE 2,261,542

READING MACHINE

Arthur H. Dickinson, Bronxville, and John N. Wheeler, Hawthorne, N. Y., assignors to International Business Machines Corporation, New York, N. Y., a corporation of New York Application December 21, 1937; Serial No. 180,980

3 Claims. (Cl. 235—61.11)

This invention relates to reading machines adapted to convert legible characterizations into electrical conditions for controlling purposes.

An object of the present invention is to provide a machine controlled by a control record medium having legible character representations of which portions or sections are adapted to control the operation of associated controlled mechanism in the machine in accordance with the various character representations or code marks disposed on the said medium.

Another object of the present invention is to provide a machine controlled by legible printed representations on a record medium having differently positioned characterizing areas or code marks for each representation capable of modifying rays of radiant energy to control associated light responsive mechanism in the machine.

Another object of the present invention is to provide scanning means having control representations disposed thereon to effect reading or identifying the various character representations to control the associated mechanisms accordingly.

Still another object of the present invention is to convert the control representations or code marks into electrical conditions initiated at different intervals by modifying rays of light by means of the light controlling areas or sections of the representations.

Still another object is to provide means to read the code marks successively, and to provide means to skip automatically the reading of certain selected character representations.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a detail view showing a line of characters disposed on the control sheet.

Fig. 3 is a developed view of the perforated scanning tape.

Fig. 10 is a timing chart of the machine.

Fig. 11 is a circuit diagram of the machine.

Fig. 14 is a plan view of the modification embodying card feeding and sensing means.

General description

Figure 1:
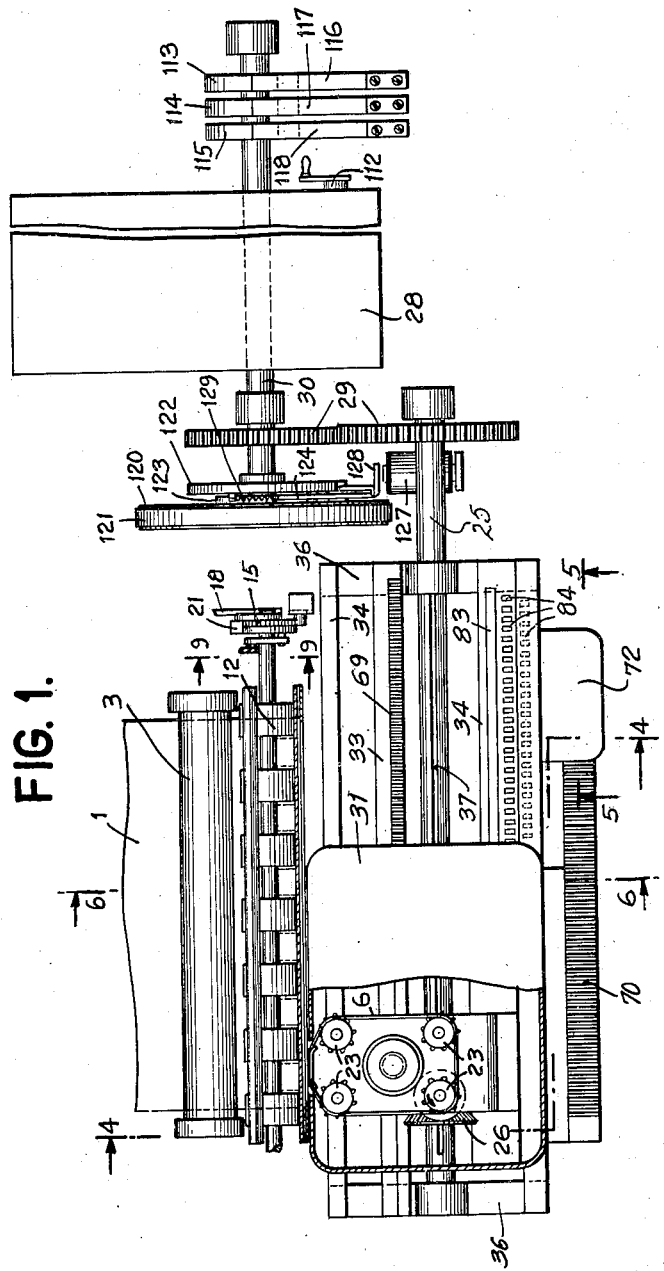
Fig. 1 is a plan view of the light responsive machine.

Referring now to Figs. 1 to 4, the present invention, broadly and briefly, comprises a translucent record medium 1 having different opaque characters 2 disposed thereon, a source of radiant energy such as the light source 3 and a condenser 4 to direct the rays of light to an analyzing position 5, scanning means such as tape 6, provided with differently positioned scanning openings 7 disposed between the record medium and a radiant energy responsive device 8 such as a photocell. The record medium is adapted to remain stationary during the scanning period, while the openings in the said tape are successively positioned or advanced to the analyzing position to modify the rays of light in accordance with the characters sensed. As is seen from Figs. 2 and 3, the openings 7 of the tape 6 are differentially positioned transversely of the tape and as the tape is moved with respect to the characters, different portions of the character outlines are scanned by each one of the differentially positioned holes and as is obvious from Fig. 2 the entire group of holes 7 incrementally scan the entire character outline. Upon scanning a character having a control or light affecting area positioned so as to correspond to a particular opening on the scanning tape, the photocell means is actuated by the modified rays of light to operate control elements in accordance with the characters scanned. When correspondence between the control sections of the characters and the control apertures of the scanning tape is effected, the rays of light impinging on the photocell are modified so that a minimum or substantially zero amount of light is impinged thereon to activate the associated amplifying system, thus controlling the operation of the associated control devices.

Upon completion of reading the scanned character and controlling the associated devices in accordance therewith, the scanning device is advanced to the next character position on the record medium to repeat again the scanning operation to effect reading of the scanned character. Before continuing with the detailed description of the scanning means, the control record medium will be described.

Record medium

Figure 12:
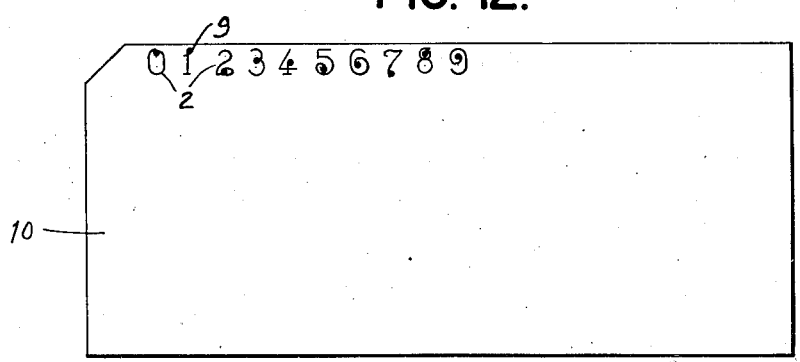
Fig. 12 shows a known type tabulating card bearing characters having code marks or characterizing portions.

Referring to Figs. 2 and 12, the record medium may comprise a light translucent sheet 1 which may be a continuous record sheet or an individual sheet having disposed thereon lines of different legible printed characters such as indicated by the reference character 2. The character fields or areas are divided into equal sections so that the characterizing portions or code marks 9 thereof may be disposed in one of ten different positions or sections. The said characterizing portions or code marks form part of the individual character outlines, so as to be in effect thickened portions of the legible printed character representations. These code marks 9 are arranged so as to occupy different positions of the character representations so as not to overlap one another. The said marks or sections 9 form the light affecting or modifying areas and comprise the control sections of the character representations. The characters, as mentioned hereinbefore, may be disposed on a continuous record or individual sheet such as the well known type of tabulating card as represented by the reference character 10. The record medium may be translucent or opaque. For example, in the description to follow, the main embodiment will be shown to employ a translucent record medium and suitable sensing means for effecting reading of the characters disposed thereon, whereas in the description of a modification of the present invention an opaque record medium and its related sensing means will be shown and described.

Record guide and feeding means

Figure 4:
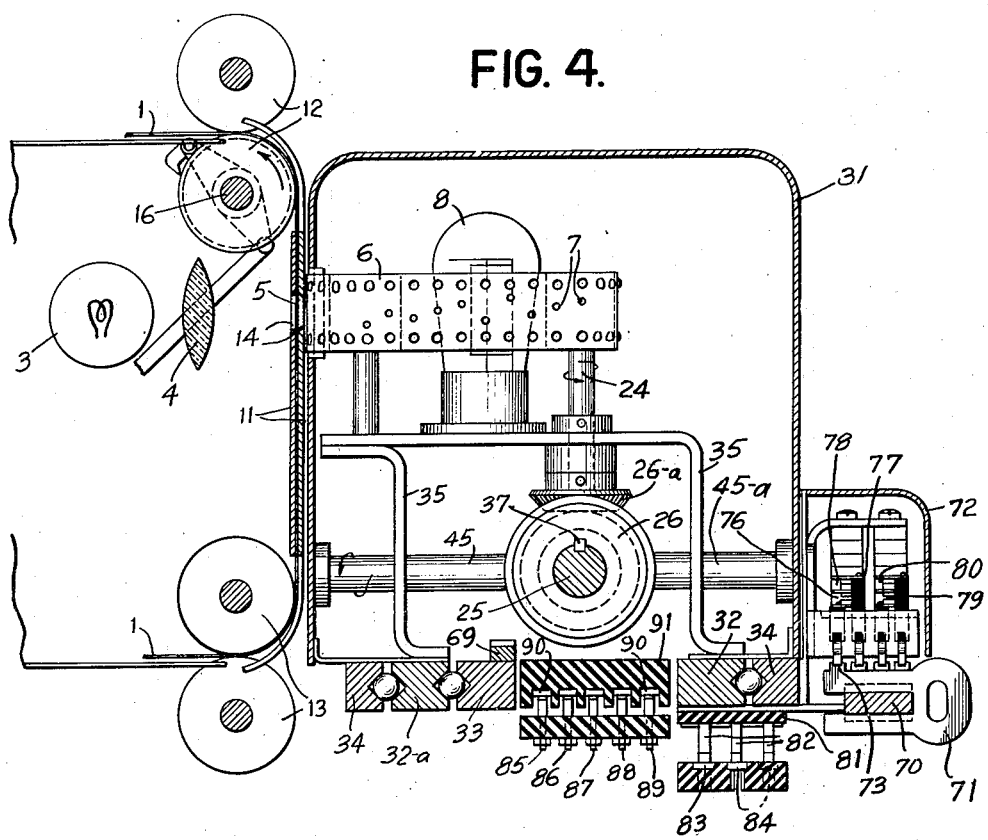
Fig. 4 is a sectional view of the machine along the lines 4—4 of Fig. 1.

Referring now to Fig. 4, one type of record medium or sheet guide and feeding means is shown to comprise a pair of record guide members 11 disposed so as to permit the record 1 to be fed therebetween by means of suitable feed rollers 12 and 13. A character analyzing position 5 is provided and is shown to be in the form of apertures or slots 14 formed in the guide members and are extended therein to a length equal to the width of the record, so as to expose an entire line of characters disposed on the record.

Figure 9:
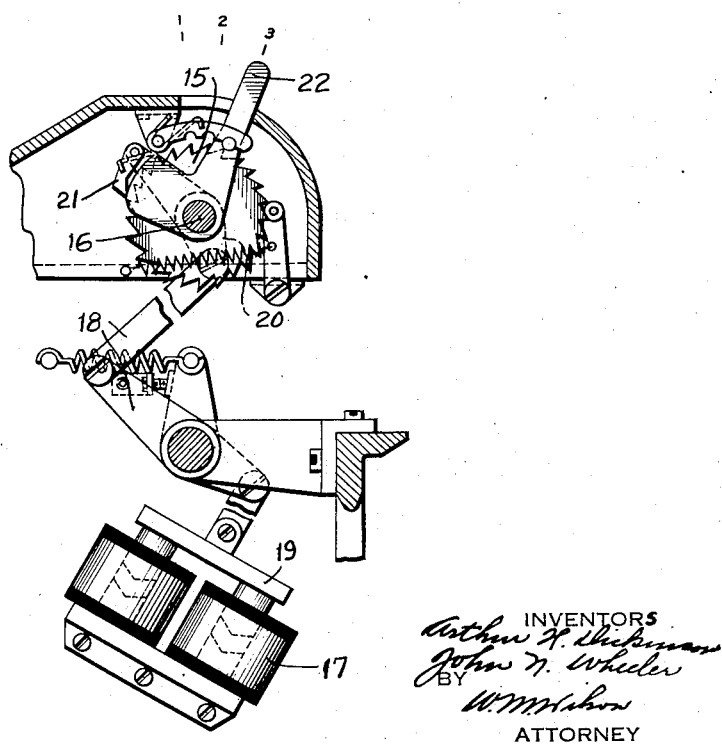
Fig. 9 is a detail sectional view of the sheet feeding means along the lines 9—9 of Fig. 1.

Associated with the feed rollers 12 is a known type of sheet feeding means and shown in detail in Fig. 9 to comprise a ratchet wheel 15 secured to the one feed roller shaft 16 and associated pawl mechanism controlled by the line spacing solenoid 17. By means of the links 18 operatively connected to the armature 19 of the solenoid and one arm of the bell crank lever 20, the spring pressed pawl 21, supported by the other arm of the bell crank lever 20, is operated upon energization of the solenoid 17 to engage the ratchet wheel 15 and rotate the said wheel and feed rollers 12 advancing the record 1, thereby presenting the next line of characters disposed thereon to the analyzing position. A control lever 22 is provided to control the operation of the pawl 21 so that one, two or three line spaces can be effected, upon positioning of the lever 22 in one of the corresponding operating positions shown in Fig. 9. The method of controlling the energization of the line spacing solenoid 17 will be described later herein. For further detailed description of the sheet feeding mechanism, reference should be made to U. S. Patent 2,093,545.

Analyzing unit

Referring now to Figs. 1, 3 and 4, the analyzing unit comprises an endless tape 6 suitably supported and advanced past the analyzing position by a series of sprocket wheels 23, one of which is secured to a driving shaft 24 which is rotated by the drive shaft 25 through the gearing 26 and 26—a. The scanning tape 6 is shown developed in Fig. 3 and comprises an opaque belt having a series of differently positioned openings 7 to effect reading of the characters disposed on record medium 1. The said openings are positioned on the tape to correspond to and match the differently allocated characterizing areas 9 of the character representations on the record. The method of effecting the reading of the characters on the record will now be evident, since the scanning tape being positioned between the record 1 and the light responsive means 8, it is seen that each time an opening 7 on the tape is advanced to the analyzing position, in the event the code mark of the character and the opening are not in alignment, the rays of light are permitted to be impinged with full effect on the photocell. Energization of the photocell by the light rays conditions the associated amplifier unit 27 (Fig. 11) so that no current flows at that time in its output circuit. When an opening is aligned with a portion or elemental area of the character, exclusive of the code mark, the design and size of the opening with respect to the elemental area are such that a major portion of the light still impinges upon the photocell. However, when the opening on the tape and the characterizing area or code mark of the character match or are aligned, the rays of light are modified so that substantially no light rays are impinged on the photocell at that time, thus permitting the amplifier unit to be conditioned so that current flows in the output circuit thereof. In this manner the different characters on the record medium are read or analyzed by the advancing scanning tape to initiate electrical impulses at different timed intervals in the scanning cycle. Since the outlines of the characters are not as thick as the characterizing areas, it is evident from the statements just set forth that these outlines are not effective to block off the light rays from the photocells sufficiently to render the photocell effective to condition the amplifier unit so as to be conductive. The manner of controlling the associated controlled mechanism by the initiated impulses will be described later herein. However, it should be mentioned that the scanning tape 6 is operated in synchronism with the controlled character manifesting or indicating device one type of which is indicated generally by the reference character 28 (Fig. 1), by means of the gears 29 interconnecting the scanning unit drive shaft 25 and the drive shaft 30 of the said device. The ratio of the different driving gears is arranged so that the scanning tape 6 completes one revolution for every second revolution of the drive shaft 30. For this reason the scanning tape is provided with two complete sets of openings to analyze the characters. It is noted that between the sets of openings of the tape an imperforate section is provided which is greater than the imperforate sections between the scanning openings. This said imperforate section is provided so that upon completion of the scanning of each character the various functional mechanisms can be operated before the next scanning cycle is initiated, such as positioning the scanning unit to the next character to be read on the record, etc. The means for positioning or advancing the scanning unit successively from character to character in each line will now be described briefly.

*Scanning unit positioning means*

The mechanism to advance the scanning unit so as to scan each character in each line successively and to return the scanning unit upon completion of scanning each line to a position to scan the first character of the next line is shown and described in detail in the said U. S. Patent No. 2,093,545, so that the following brief description is deemed sufficient. Referring to Fig. 4, the described scanning mechanism is enclosed in a suitable housing member 31 secured to grooved bars 32 and 32—a which may be positioned transversely with respect to the stationary grooved bars 33 and 34, due to bearings supported in the grooves thereof. The sub-frames 35 also are secured to bars 32 and 32—a and are provided to support the tape feed sprockets 23, the photocell unit 8, and the driving shaft 24 for the feed sprockets. The stationary bars 33 and 34 are secured to suitable end plates 36 which are suitably adapted as a support for the driving shaft 25 for the scanning unit which as shown is positioned over the said stationary bars and shaft 25. For this reason the gear 26 interconnecting shafts 24 and 25 must be slidably secured to shaft 25 by means of the key 37.

Figure 8:
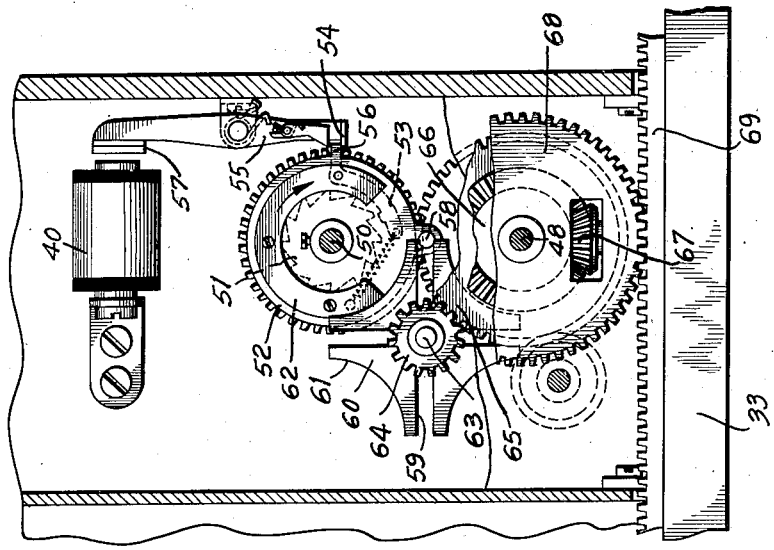
Fig. 8 is a detail view of the scanning member spacing mechanism.
Figure 6:
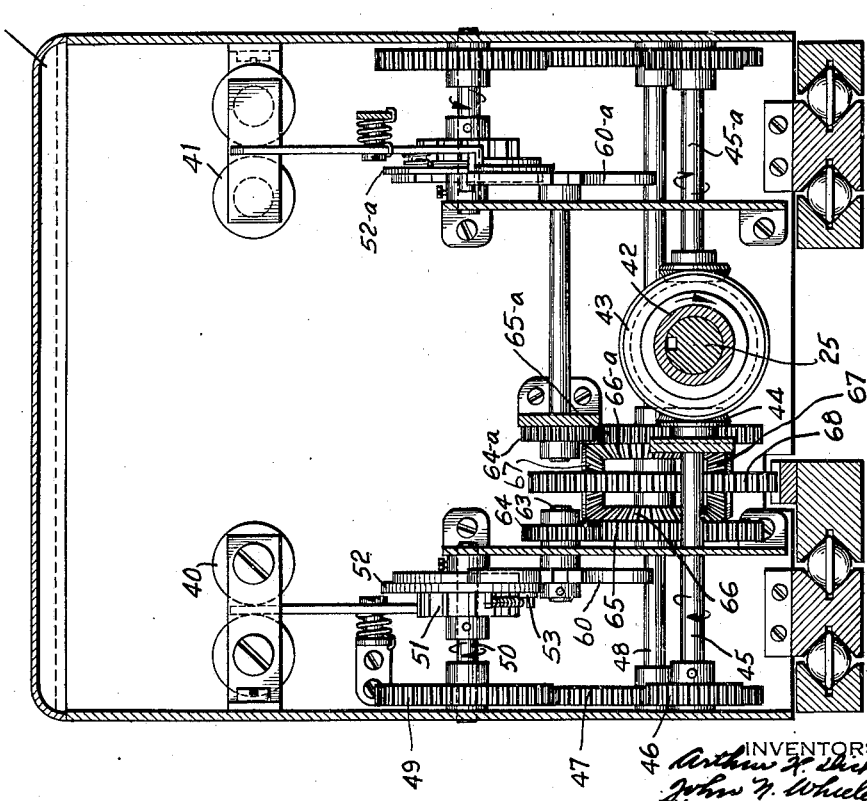
Fig. 6 is a sectional view of the machine along the lines 6—6 of Fig. 1.

With reference now to Figs. 6 and 8, the forward advancing means for the scanning unit is shown to be controlled by the magnet 40, and the means for returning the unit to the first character position of each line is shown to be controlled by magnet 41, both of the said magnets and the associated control mechanism are suitably disposed in the housing member 31. The mechanisms controlled by the magnets 40 and 41 are similar; therefore, only one of the mechanisms need be described to understand the operations thereof.

Suitably secured to sleeve 42 connected to gear 26 for movement therewith on shaft 25 is a bevel gear 43 which meshes with the bevel gear 44 fixed on shaft 45 which has also secured thereto a pinion 46. The said pinion meshes with the idler gear 47, loosely mounted on shaft 48, which in turn meshes with gear 49 secured to shaft 50. Secured to shaft 50 is a driving element 51 which may take the form of a ratchet wheel, which obviously is constantly rotated by the driving shaft 25 by means of the gearing described. Loosely mounted on shaft 50, adjacent to the driving element 51, is disc 52, and pivoted thereon is a spring urged driving pawl 53 having a lug or tooth adapted to engage the teeth of the driving element 51. The engagement of the said element and pawl is prevented by co-action of an offset lug 54 formed on a pivoted rock lever 55, and a tail 56 of the pawl and an extension lug extending from the disc 52 in the same plane as tail 56.

In this manner, the driving element 51, the associated disc 52 together with pawl 53 constitutes a one-revolution clutch controlled by the associated magnet 40 acting upon the armature 57 secured to the upper end of lever 55. A pin 58 is supported on a carrying lug which is formed as part of the disc 52 and adapted to ride in radial slots 59 formed in plate 60 which has the general shape of a Maltese cross. Normally, the said pin occupies the position shown in Fig. 8 wherein it is shown that said pin is partly inserted in one of the slots. The curved portions 61 of the plate co-act with a curved locking plate 62 secured to one side of the disc 52. The plate 60 and disc 52, with the pin 58 and locking plate 62 constitute irreversible Geneva gearing which has a ratio of one to four, that is, one revolution of the disc causes a quarter of a revolution of the plate.

The plate 60 is secured to a stud shaft 63 which has a pinion 64 secured thereto which meshes with gear 65 loosely mounted on shaft 48. Secured to the gear 65 is a bevel gear 66 which meshes with two bevel pinions 67 journaled in a gear 68 loosely mounted on shaft 48. The gear 68 meshes at all times with a rack 69 secured to the upper side of the grooved bar 33 supporting and providing a guide or track for the sensing unit in its movements axially of the record sheet. A similar bevel gear 66—a meshes with the said pinions 67 and is secured to gear 65—a which meshes with pinion 64—a rotated by plate 60—a and controlled by the associated clutch mechanism and magnet 41. The gears 65 to 68 constitute differential gearing, the purpose of which is to move the scanning unit from left to right and vice-versa under control of the magnets 40 and 41.

The operation of the described positioning mechanism should be understood and briefly is as follows: upon energization of magnet 40, the lug 54 is moved out of the path of disc 52 and pawl 53, permitting the pawl to engage the ratchet wheel 51 to rotate the disc 52 which by means of pin 58 partially rotates the plate 60, pinion 64, and differential gearing 65 to 68 to position the housing member and scanning unit one character space, that is, the scanning unit is advanced from one character to the adjacent character. For the present description it is assumed that the scanning unit is positioned from left to right as viewed in Fig. 1 upon energization of magnet 40. The energization of magnet 41 causes the associated mechanism to be operated which is similar to the mechanism just described but adapted to rotate the gear 68 in the reverse direction.

A single character spacing is effected if the magnets 40 and 41 are deenergized immediately so as to position the lugs 54 in the path of the disc 52 and pawl 53 so that upon one revolution of disc 52 the pawl is disengaged from the ratchet gear 51. It is obvious, however, that a number of character spacings can be effected if the said magnets are maintained energized so that the discs 52 are rotated more than a single revolution.

Suitably secured to the movable bar 32 is elongated slotted bar 70 (Figs. 1 and 4) having a plurality of slots for each character position of the scanning unit, so that, if desired, a plurality of control keys 71 may be inserted in the slots to cooperate with groups of contacts suitably mounted in a stationary housing 72. Each key is provided with one extension 73, the extensions on the keys, however, are not similarly positioned, but arranged so one key is adapted to cooperate with a lever 74 to position the spring blade 75 to close the normally open contacts 76, another key is adapted to cooperate with a similar lever 74 to urge upwardly the insulated post 77 to open the normally closed contacts 78. Similarly separate keys are provided to individually operate the contacts 79 and 80, respectively, similar to contacts 76 and 78, the purpose of which will be understood as the description progresses.

Also secured to the lower side of movable bar 32 is an insulating member 81 carrying a plurality of interconnected brushes 82 (Figs. 4 and 11) adapted to ride over a common conducting segment 83 and individual staggered conducting segments 84 (Fig. 1). The segments 84 in Fig. 11 are only shown diagrammatically and not in staggered relationship, which in certain cases is not necessary depending entirely upon how close the characters are positioned with respect to each other. The said brushes and conducting segments are used as a column selector to control the operation of a character manifesting means, and the brushes are advanced successively over the segments as the scanning unit is advanced progressively for purposes described later herein. Slidable contact connections are provided in the form of stationary contact springs or brushes 85 to 89 (Fig. 4) engaging individual elongated contact segment members 90 supported in an insulating member 91 suitably secured to the positionable housing member 31. The said connections are provided for the various control magnets disposed in the said movable housing member and associated with the various control elements controlling the positioning and operation of the scanning unit. A suitable character manifesting or indicating means will now be described.

Accumulating means

Figure 7:
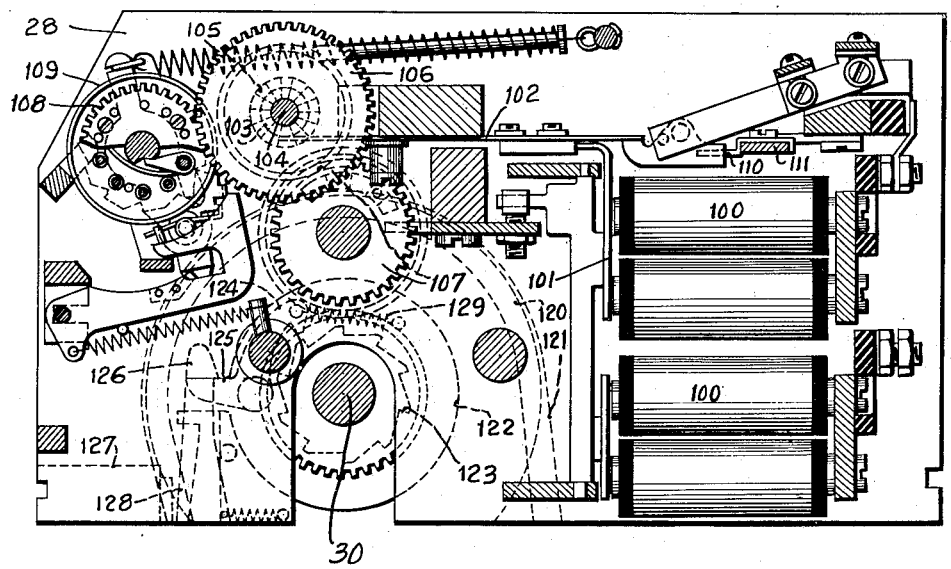
Fig. 7 is a sectional view of one type of character manifesting means.

Referring now to Figs. 1 and 7, a conventional type of accumulating means 28 will be described briefly. This unit is well known in the art and requires no detailed description, however, reference may be made to U. S. Patent No. 1,976,617 for specific structural details.

The control magnets 100 of the unit may be energized at different timed intervals in the scanning cycle, depending upon the timed interval at which the characterizing areas of each character is detected. Energization of magnet 100 attracts the armature 101 to displace the attached lever 102 causing the latching member 103 slidably mounted on shaft 104 to engage the member 105 integral with gear 106 loosely mounted on shaft 104. Gear 106, when thus coupled to the said shaft, is rotated thereby due to the gearing thereto from the main shaft 30 and gears 106 and 107, and rotation of gear 106 displaces gear 108 positioning the character index wheel 109.

Therefore, it is understood that, if during the scanning cycle the character "9" is analyzed, the magnet is energized at the nine point in the scanning cycle (see timing chart—Fig. 10) thereby permitting the index wheel to be rotated for the remaining period of the accumulator cycle. It is to be understood that an individual controlling magnet 100 is provided for each order of the accumulating means.

Referring to Fig. 11, it is seen that the energization of each order of the said means is controlled by the column or order selector 82 to 84, depending upon the position of the control brushes 82.

As mentioned, upon energization of the control magnet 100 the associated accumulating means is rendered operative, and by means of the associated elements is maintained operative until the end of the accumulator cycle, at which time the clutch element 103 is declutched by a finger 110 carried on a bar 111. This operation of the accumulator is well known and is explained fully in the last mentioned patent and needs no further description. A suitable crank for the resetting means of the accumulator is indicated by reference character 112 (see Fig. 1) associated with the index wheel shaft, and may be manually operated.

It should be mentioned at this time that it is preferred to start all the controlling elements of the system in unison such as the scanning tape and the accumulating means, that is, to start the said control elements from a normal starting position, such as the "D" position indicated in Fig. 10.

For this reason, the control elements are actuated by the main driving shaft 30 (Fig. 1) upon which cams 113 to 115 are mounted to operate the associated contacts 116 to 118, respectively. A driving element such as pulley 120 (Figs. 1 and 7) and a clutch operating member 123 integral therewith are rotatably mounted on shaft 30 and continuously rotated by any suitable means such as belt 121 connected to motor 130 (Fig. 11). A suitable supporting member 122 for the dog 124, pivotally mounted thereon, is fixedly secured to shaft 30. The member 122 and dog 124 have protruding fingers such as indicated by the reference character 125 and are adapted to be engaged by the stop 126 which is an extension of armature 128 when the parts are in the position as shown in the figure.

When the clutch magnet 127 is energized to attract its armature 128, the stop 126 releases the member 122 and dog 124 so that by means of spring 129 the dog is caused to engage the clutch member 123 which is continuously rotated thereby causing the shaft 30 to be rotated.

Operation of reading machine

Referring now to Figs. 1, 4 and 11, the operation of the described control elements of the machine will now be described. Let it be assumed that the record medium 1 bearing a plurality of character representations such as shown in Fig. 2 is in proper horizontal and vertical registration, and that the scanning unit is in position to start scanning the first character in the line, and that the control switches 132 are closed to energize the motor 130, the light source 3 and provide the proper potentials for the amplifying unit 27.

Now upon operation of the start key 133 to close its associated contacts, the circuit to coil of relay 134 is completed to energize said relay and close the contacts 134—a to establish a holding circuit therefor through the normally closed contacts of the stop key 135. It is seen that the magnet 127 is energized as long as relay 134 remains energized. Energization of magnet 127 (Figs. 1 and 7) is effective to release pawl 124 to engage the driving gear 123 so as to rotate the shafts 30, 25 and 24 advancing the scanning tape 6 from the normal "D" position (see Figs. 3 and 10) to present the differently positioned openings thereon successively to the analyzing position. It is to be noted that as each opening in the tape is scanning the character, the cam 115 (Figs. 1, 10 and 11) is adapted only at such times to close the associated cam contacts 118, and whenever the openings 7 on the tape, as said openings are presented to the analyzing position, do not correspond to the particular positioned characterizing area 9 of the character scanned, the rays of light are permitted to be impinged on the photocell 8, and thereby condition the amplifier unit 27 so that no current flows in the output circuit thereof, thus maintaining the relay 136 deenergized and inoperative. However, when the position of one of the said openings in the scanning tape coincides with the characterizing area of the scanned character the rays of light are prevented from impinging on the photocell, for at this instance the characterizing area and opening on the tape are aligned so as to block off the source of light from the photocell, thus conditioning the amplifying unit 27 so that current flows in its output circuit to energize the relay 136. Energization of said relay establishes the following circuit through the contacts 136—a operated thereby: from one terminal of the battery 138—a normally closed contacts 139—a, conductor 140, contacts 136—a, now closed, to the common conducting segment 83, brushes 82 (which are positioned by the scanning unit, and by virtue of its position the brushes are adapted to engage the first contact segment 84—1), contact segment 84—1, plug sockets 141 (when connected in a manner well known) and the connected control magnet 100 to the other terminal of the battery 138—a, energizing said control magnet. Energization of control magnet 100 is effective to clutch the elements 103 and 105 to advance the character index wheel 109 in accordance with the character analyzed. Near the end of the scanning cycle the cam 114 operates the contacts 117 to complete the circuit, from conductor 137, through contacts 139—a, contacts 117 now closed, brush 88, magnet 40, brush 89 to conductor 138 to energize the said magnet momentarily. Energization of magnet 40 (Figs. 6 and 8) is effective to release the disc 52, rotating plate 60, pinion 64, gear 65 and the differential gearing 66 to 68 to advance the housing member 31 and scanning unit to the adjacent character on the record medium. Since the magnet 40 is only energized momentarily, the disc 52 is blocked by lug 54 upon completion of a single rotation, thus limiting the positioning of the scanning unit from the character scanned to the next immediate character. The machine is now conditioned to scan the second character on the record medium in a manner just described to control the accumulating means accordingly. Positioning the scanning unit is also effective to position the selector brushes 82 to engage the second contact segment 84—2 and condition the circuit to the control magnet of the second order of the accumulating means, to permit this control magnet to be energized upon operation of the relay 136. Since the scanning unit is positioned from left to right as viewed in Fig. 1, it is evident that the highest order character is scanned first and entered in the corresponding accumulating order, and the next highest order character is then scanned and entered in the corresponding order, and so on.

Figure 5:
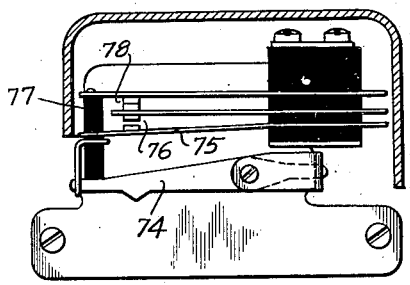
Fig. 5 is a detail sectional view of the machine along the lines 5—5 of Fig. 1.

Now, let it be assumed that there are several unprinted columns on the record medium and it is desired to skip such columns or that it is desired not to scan several columns of the characters appearing on the record and skip these columns. In this event a key 71 (see Figs. 4, 5 and 11) having an extension 73 adapted to operate contacts 79 is inserted in one of the slots in bar 70 corresponding to the first column desired to be skipped, and a key having an extension adapted to operate contacts 80 in another one of the slots in bar 70 corresponding to the last column to be skipped.

Then, as the scanning unit is advanced to the said columns desired to be skipped, the contacts 79 are operated to close the battery circuit to the coil of relay 142, energizing said relay to close contacts 142—a, b and c. A holding circuit is established for the said relay by the circuit established from conductor 137, through normally closed contacts 80, contacts 142—a, and coil of said relay to conductor 138, maintaining this relay energized until the normally closed contacts are opened by the corresponding key 71. By means of the closed contacts 142—c relay 139 is energized to close the contacts 139—b to establish a holding circuit for said relay through the normally closed cam contacts 116. Energization of relay 139 also causes the normally closed contacts 139—a to be opened at this time opening the control circuit to the control magnets of the accumulating means. The following circuit is established through contacts 142—b, conductor 137, normally closed contacts 143—b, contacts 142—b now closed, brush 88, magnet 40 and brush 89 to conductor 138 to energize magnet 40 and maintain the said magnet energized until relay 142 is deenergized.

Under the described conditions, when several columns are desired to be skipped, the disc 52 (Fig. 8) is permitted to complete more than one revolution thereby continuously advancing the scanning unit to the last column desired to be skipped. Upon positioning the scanning unit to the said last column, the contacts 80 are opened by the corresponding key 71 to break the holding circuit for relay 142, deenergizing this relay and the magnet 40, thus positioning the scanning unit in the desired position. It is to be noted that the scanning of the characters at this time is not effective to operate the accumulating means until the beginning of the scanning cycle or "D" position designated in Fig. 10, due to the energized relay 139. Near the end of the scanning cycle the cam 113 is effective to open the normally closed contacts 116, breaking the holding circuit for relay 139, deenergizing the relay and conditioning the accumulating control means control circuit for operation by closing the contacts 139—a. Analyzation of the characters is now effected as described hereinabove to control the accumulating means accordingly.

Now let it be assumed that a pair of keys 71 are positioned in the slots in the bar 70 corresponding to the first and last columns of characters disposed on the record, so that when the scanning unit has completely scanned the character in the last column, the unit is advanced so that the said key 71 is effective to close contacts 76 and when the unit is positioned to scan the first column of characters on the record, the contacts 78 are opened by the corresponding key 71.

Assume that the last character in the line has been scanned and that the unit has been advanced to operate the contacts 76 to energize relay 143 establishing a holding circuit therefor through normally closed contacts 78 and contacts 143—a now closed. Since solenoid 17 and magnet 41 are connected in parallel to relay 143, the said solenoid and magnet are energized to effect (1) feeding of the record medium by means of solenoid 17 (Fig. 9) to position the next line of characters to the sensing position 5, and (2) to return the scanning unit to the first columnar position of the record by means of energized magnet 41 (Fig. 6).

Energized magnet 41 releases disc 52—a to rotate plate 60—a, pinion 64—a, gear 65—a and differential gearing 66 to 68 to return the scanning unit to the said columnar position. It is to be noted that while the scanning unit is returned to the first columnar position, contacts 143—b are opened as long as relay 143 is energized, thereby preventing magnet 40 from being energized, and by means of contacts 143—c now closed relay 139 is energized and locked by the circuit established by contacts 139—b now closed. Contacts 139—a are opened due to the energization of relay 139 to open the control circuit to the accumulating means while the unit is being returned as described.

When the first columnar position is reached by the scanning unit, the contacts 78 are opened by means of the positioned key 71 to break the holding circuit to relay 143, deenergizing said relay, solenoid 17 and magnet 41, thus preventing further movement of the scanning unit. Near the end of the scanning cycle the contacts 116 are opened to deenergize relay 139 thus conditioning the described circuits so that the scanning unit is effective to control the accumulating means in accordance with the characters scanned in the said positioned line of characters.

*Modification*

Figure 13:
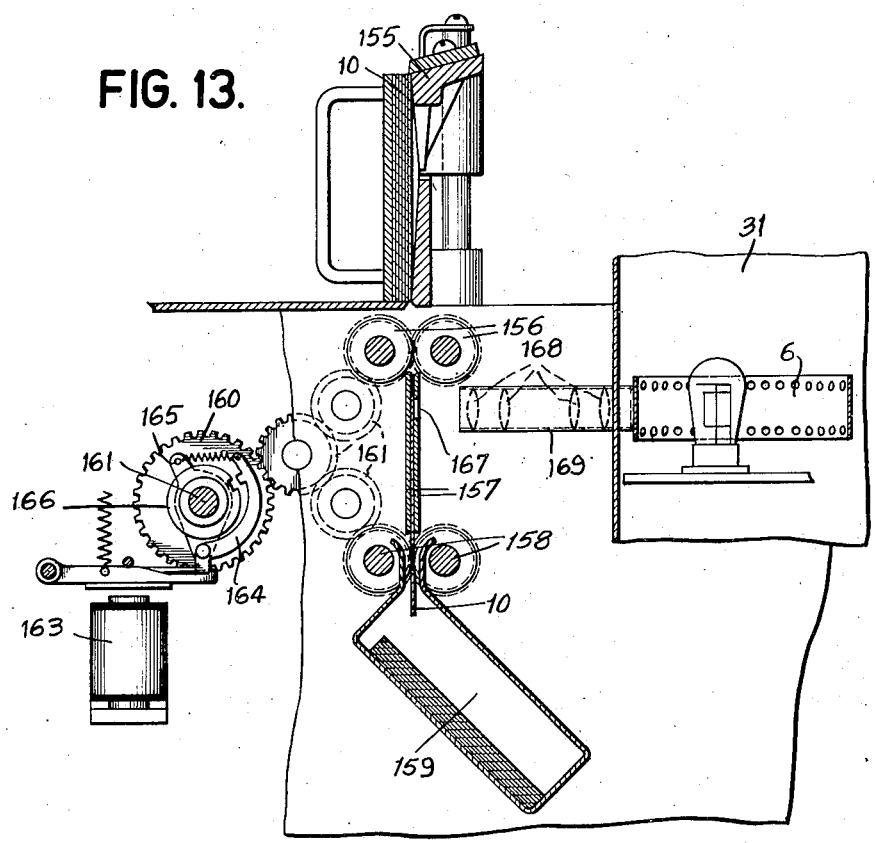
Fig. 13 is a sectional view of known card feeding means.

Referring now to Figs. 12 to 14, it is shown how the principles of the reading machine described hereinabove can be applied to the known electrical tabulating systems employing the usual and well known tabulating card. A card 10 of this type is shown in Fig. 12 bearing a plurality of the characters 2 similar to the type of characters described in conjunction with the record medium shown in Fig. 2. The said characters are shown disposed in a line near the top of the card 10. In Fig. 13 the well known card feeding mechanism is shown, which is similar to the one shown in U. S. Patent 1,486,149, and comprises a card picker mechinsm 155 adapted to feed the cards 10 one by one to the feed rollers 156 by which they are passed through the guide members 157 to the lower rollers 158, and thence passed out into a suitable receptacle 159. The card picker mechanism may be operated by suitable gearing, the rotation of which is controlled by gear 160. The feed rollers 156 and 158 are also rotated by gear 160 by means of the gearing generally indicated by the reference character 161. A clutch similar to the type described (comprising in part elements 123 to 128) in connection with the accumulator mechanism and shown in Fig. 7 is employed to control the rotation of gear 160 by the rotating shaft 161 which in turn may be operated by means of suitable gearing 162 by the shaft 30. Upon energization of control magnet 163 the pawl 164 and supporting member 165 are released, permitting the pawl to engage the continuously rotating notched collar 166 to drive the gear 160 secured to member 165 in unison with the driving member 166 and shaft 161. Magnet 163 is energized momentarily and thus is effective to declutch the said operating elements upon completion of a single revolution of the clutch mechanism. During this single cycle the card feeding mechanism is operated to feed a single card to the feed rollers 156 and 158 to be held there in position by the said rollers during the scanning cycle.

The card is held in position so that the line of legible printed characters appearing on the card are presented to the analyzing position 167 which comprises an elongated opening in one of the guide members 157. The scanning unit shown in Fig. 14 is similar to the unit described hereinabove with the following exception: A lens system 168 supported by the housing tube 169 is secured to the movable housing member 31 in which the scanning unit is disposed. Suitable sources of light 170 are provided with associated condensers 171 to direct the rays of light to the analyzing position so that the images of the character representations appearing on the tabulating card are projected on the scanning tape of the scanning unit. The method of scanning the characters is exactly as described hereinabove and the manner of controlling the associated accumulator mechanism is similar to that described.

Figure 15:
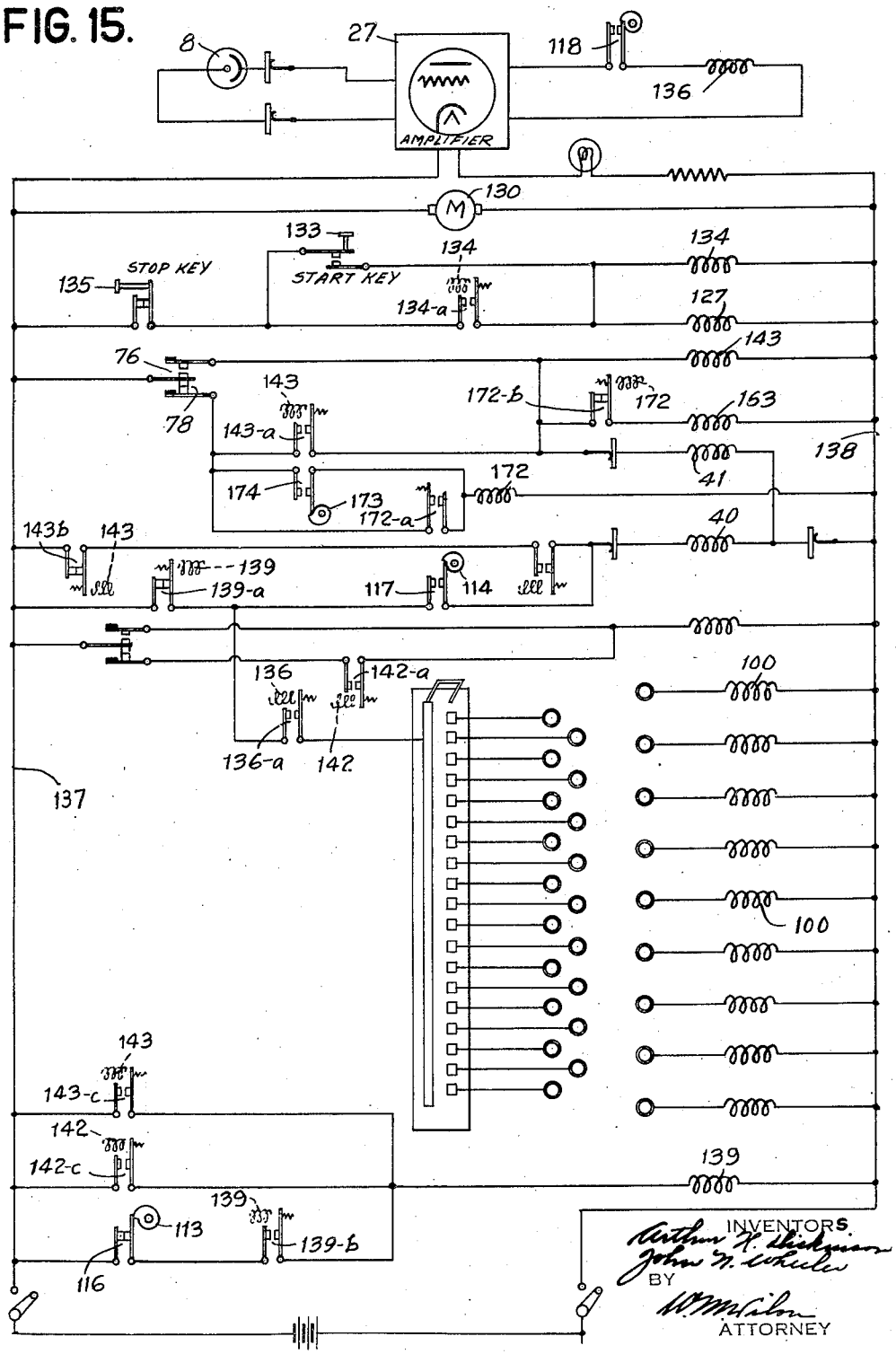
Fig. 15 is a circuit diagram for the modification.

The only change required in the circuit diagram shown in Fig. 11 is to replace the line spacing solenoid 17 by the card feeding control magnet 163 (see Fig. 15) and associated control relays which will now be described. Upon completion of the analyzation of a line of characters on the record card, the scanning unit is returned in the same manner, as described hereinabove, to the normal starting character position by means of the control magnet 41 and at the same time the control magnet 163 is energized through the normally closed contacts 172—b to operate the card feeding mechanism to present another card to the scanning unit. The relay 172 is adapted to be energized shortly after the energization of control magnet 163 to deenergize the said magnet. Contacts 174 are controlled by the cam 173 suitably secured to gear 160 which is released by the clutch magnet 163 and are adapted to close the contacts 174 before the end of the card feeding cycle (see Fig. 10) to energize relay 172 through the normally closed contacts 78 and contacts 174 now closed, and establish a holding circuit for the said relay through contacts 78 and 172—a now closed maintaining relay 172 energized until the scanning unit is returned to the first character position, when, as described before, the contacts 78 are opened to restore the conditioned relay 172 to normal. While the said relay remains energized, contacts 172—b are opened to break the circuit to control magnet 163 deenergizing said magnet thus preventing the card feeding means to advance more than one card to the analyzing position before scanning of the next presented line of characters is initiated.

In this manner the characters on the tabulating card having characterizing sections are scanned successively and the said sections of the characters are effective to modify the rays of light when the characterizing sections and perforate sections of the scanning tape are in alignment or correspondence to condition the light responsive means ad associated control elements to control the accumulating means in accordance wtih the characters analyzed.

The record control means herein described as operating in conjunction with the reading means forms the subject matter of copending application filed December 21, 1937, Ser. No. 180,981.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. A machine of the character described controlled by a record, bearing legible characters, each different character having a legible character outline and a single identifying code mark in a different index point position, each character outline and a code mark being conjoined, comprising a scanning means for completely incrementally scanning any one of the characters and including a light source for illuminating a character, light responsive means, a scanning member having a plurality of light transmitting sections, the configurations of each of said sections conforming to that of said code marks and being differentially positioned in accordance with said code, said member being interposed between said record and light responsive means to control the amount of light impinging upon said responsive means, means for cyclically moving said member for scanning successively all portions of said one character during predetermined cycles, the amount of light impinging upon said responsive means being greatly modified only upon coincidence of a section and an identifying code mark; means controlled by said light responsive means upon such coincidence for initiating impulses at differential times in a cycle, and differentially settable means operative in synchronism with said moving means and controlled by said impulse initiating means whereby said differentially settable means is set in accordance with the respective identity of the character scanned.

2. The invention set forth in claim 1, in which said scanning member comprises an endless flexible member bearing said plurality of light transmitting sections.

3. The invention set forth in claim 1, in which the scanning member comprises an opaque endless flexible tape, said light transmitting sections comprising a plurality of apertures, which apertures are located at different vertical positions on the tape, and at equally spaced horizontal positions lengthwise on the tape in accordance with said code.

ARTHUR H. DICKINSON.
JOHN N. WHEELER.